United States Patent [19]

Engel

[11] 4,338,025
[45] Jul. 6, 1982

[54] IDENTIFICATION CARD, SENSOR, AND SYSTEM

[76] Inventor: Elton D. Engel, 34005 LaMoyne, Livonia, Mich. 48154

[21] Appl. No.: 126,409

[22] Filed: Mar. 3, 1980

Related U.S. Application Data

[62] Division of Ser. No. 895,011, Apr. 10, 1978, Pat. No. 4,202,120.

[51] Int. Cl.³ .................... G06K 9/00; B42D 15/02; G03B 23/00
[52] U.S. Cl. .......................... 356/71; 283/7; 353/118
[58] Field of Search .................. 356/71, 394; 340/146.3 E, 149 A; 283/6, 7, 8 R, 8 A, 8 B; 250/566; 40/2.2, 1.5, 1.6; 434/155; 235/380-382; 118/31.5; 353/118; 101/369

[56] References Cited

U.S. PATENT DOCUMENTS

| | | | |
|---|---|---|---|
| 2,287,678 | 6/1942 | Godwin | 350/146.3 E |
| 3,394,246 | 7/1968 | Goldman | 340/149 A |
| 3,584,958 | 6/1971 | Miller et al. | 356/394 |
| 3,677,623 | 7/1972 | Hall et al. | 356/71 |
| 3,709,524 | 1/1973 | McKee et al. | 283/7 |
| 3,806,704 | 4/1974 | Shinal | 340/149 A |
| 3,848,348 | 11/1974 | Hawley | 40/491 |
| 4,006,980 | 2/1977 | Wells | 353/118 |

OTHER PUBLICATIONS

Schuenzel et al., "Credit Card Systems", IBM Tech. Disc. Bulletin, vol. 13, #1, 6-1970, pp. 176-177.
May, G. H., "Personalizing a Credit Card", IBM Tech. Disc. Bulletin, vol. 12, #7, 12-1969, pp. 970-971.
Ross, R. M., "Credit Card with an Erasable Field for Human Readability", IBM Tech. Disc. Bulletin, vol. 8, #11, 4-1966, p. 1491.
May, G. H., "Personalizing a Credit Card", IBM Tech. Disc. Bull., 12-1969, p. 969.

*Primary Examiner*—William H. Punter
*Attorney, Agent, or Firm*—Olsen and Stephenson

[57] ABSTRACT

There is disclosed a novel identification card, sensor, and system using fingerprint or thumbprint pattern identification to confirm the user's identity. The preferred embodiment of identification card contains a sliding transparent window which is concealed when the card is not in use. When the card is used, it is inserted into a sensor and the window is slide to a visible position where the user can impress his or her thumbprint or fingerprint thereon. The sensor scans the thumbprint or fingerprint and transmits the pattern to a central file for comparison with a record thumbprint or fingerprint of the individual who is authorized to use the identification card. An account number can be located on the card enabling the sensor to scan and transmit to the central file, information to identify the record thumbprint or fingerprint against which the user's physical thumbprint or fingerprint is being compared. The authorized user is confirmed by an appropriate indication at the sensor while an unauthorized user is detected by another appropriate indication. Once the authorized user's identity has been confirmed, the transaction is completed; then the transparent window is returned to its concealed position. As the window is being slid to its concealed position, a wiper within the card wipes the residual print from the window. The sensor is particularly convenient for use and includes a compact scanning device and also a keyboard for entry of additional information relating to the transaction.

1 Claim, 46 Drawing Figures

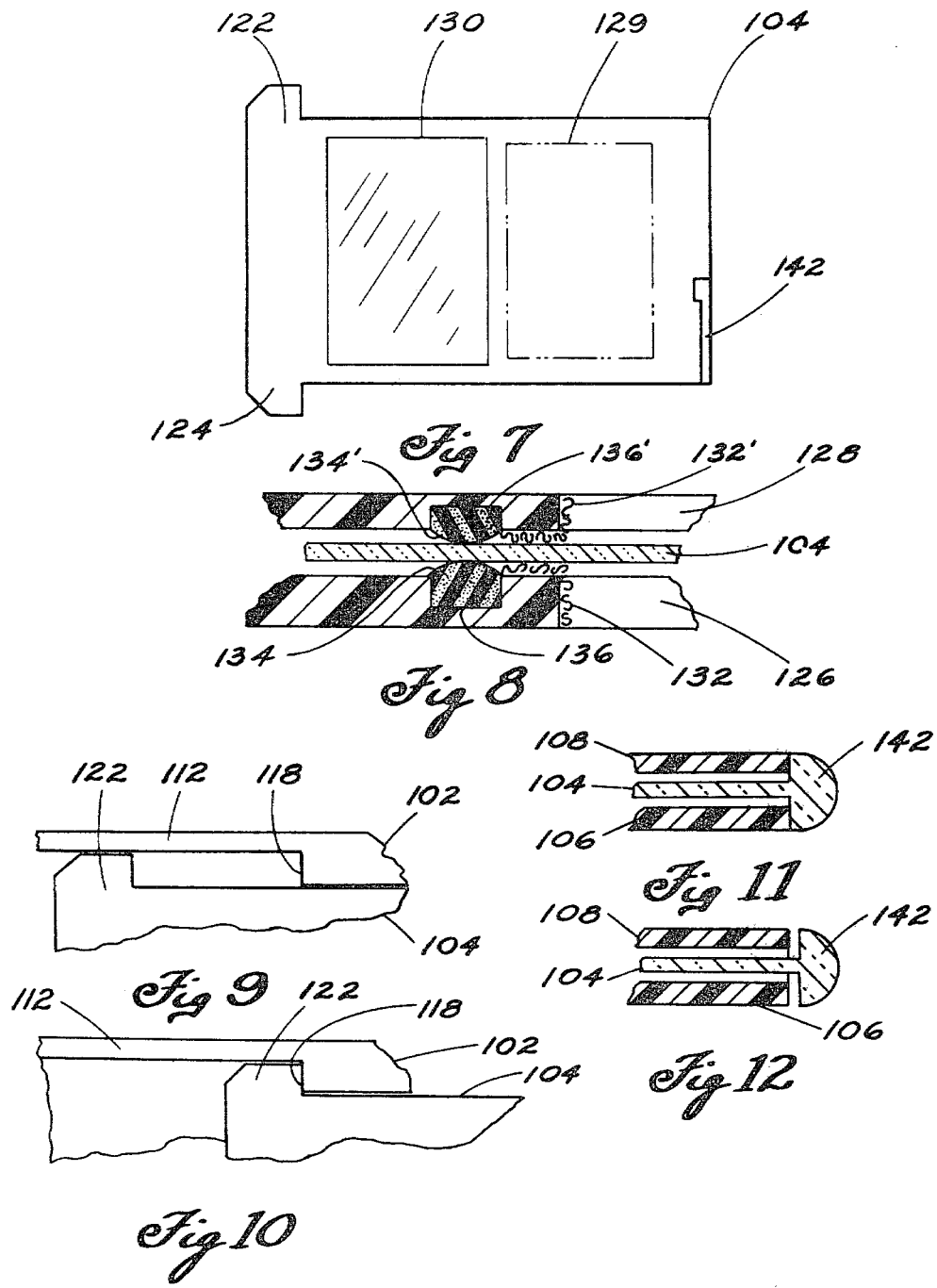

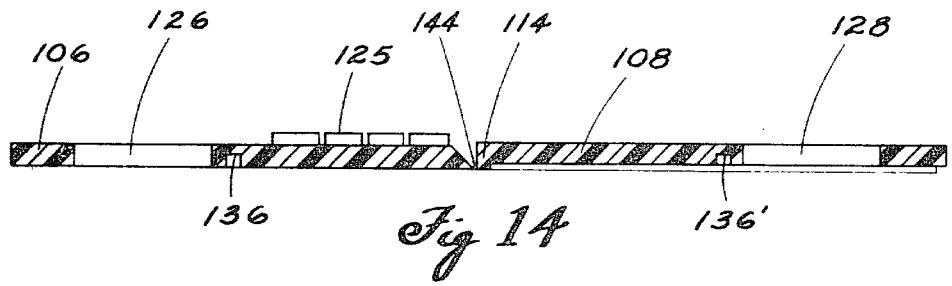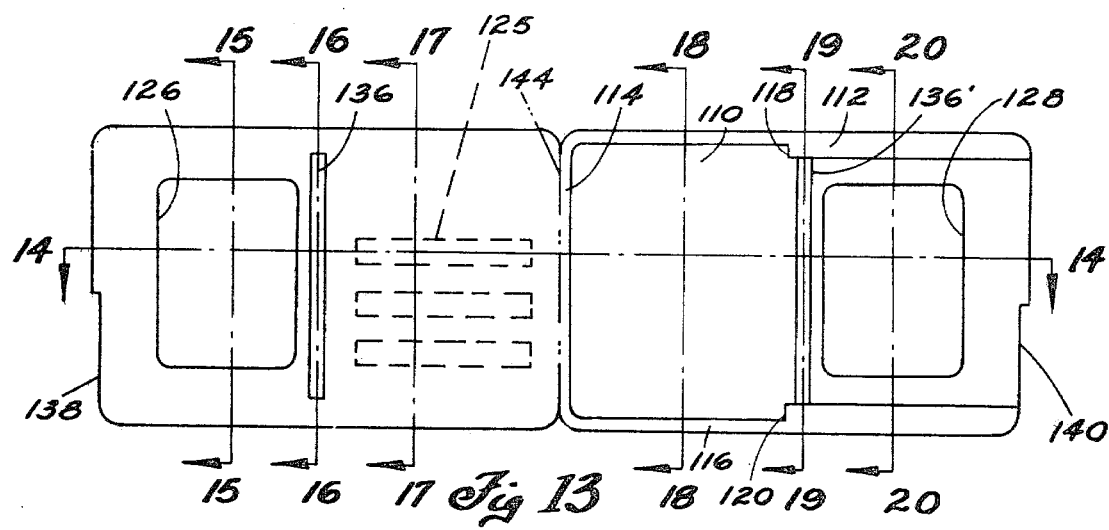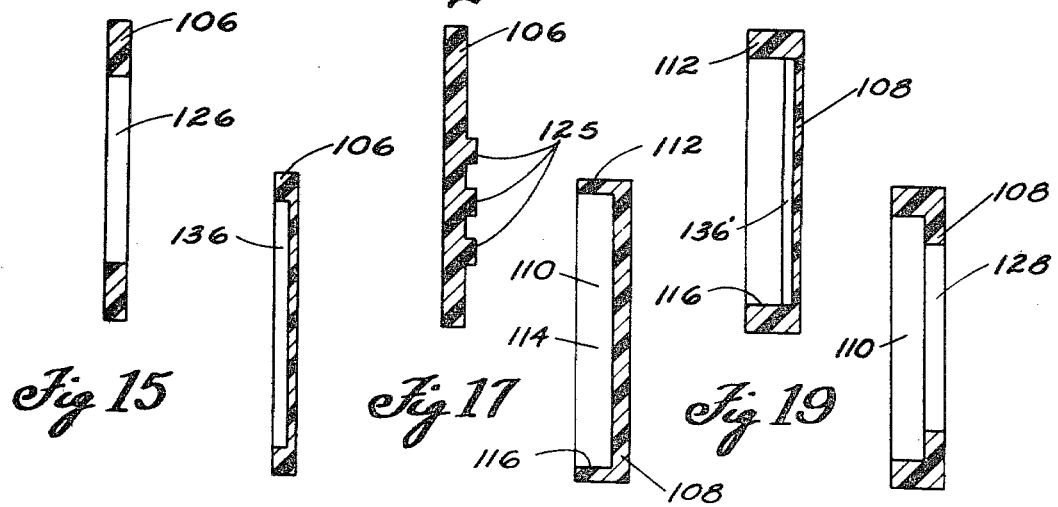

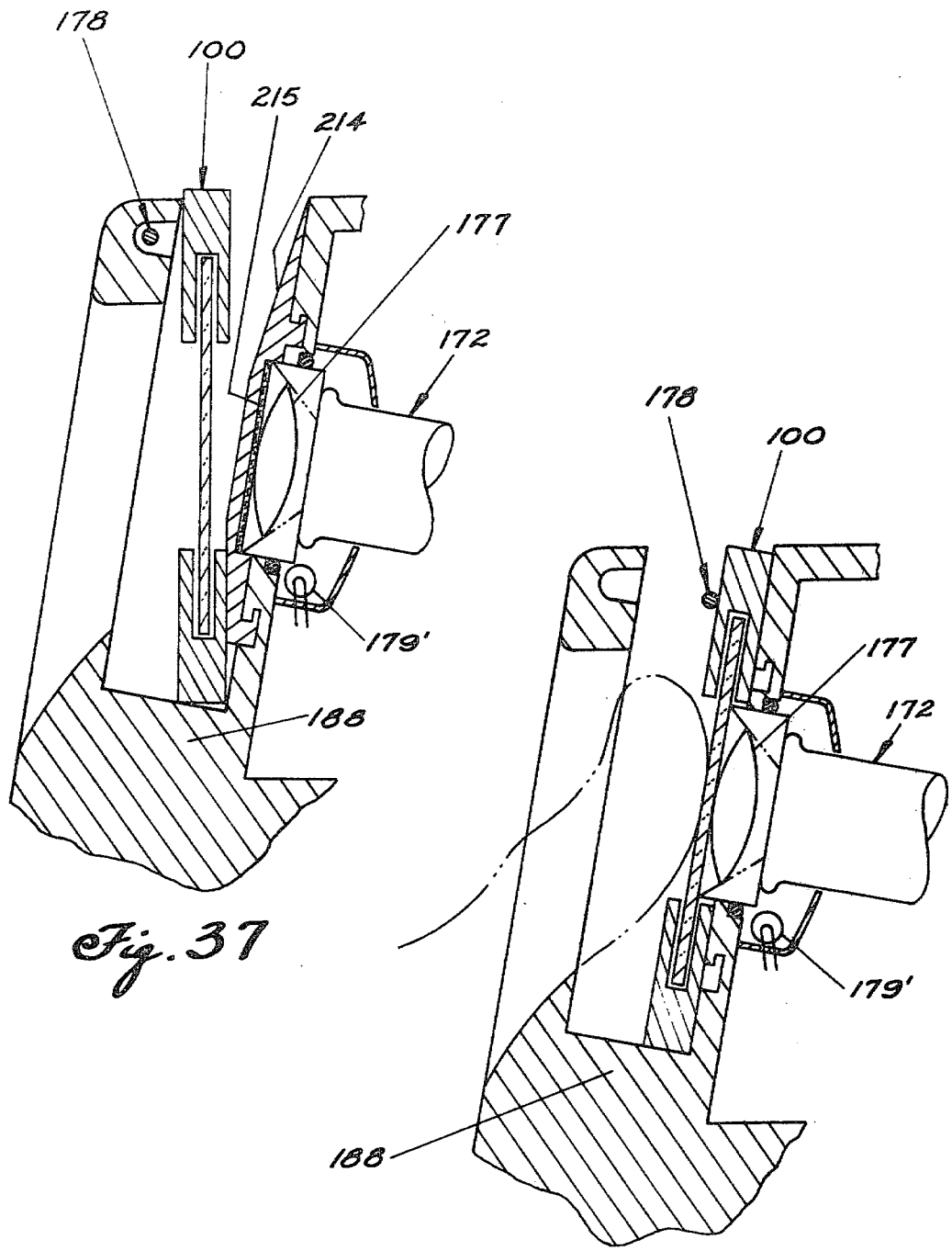

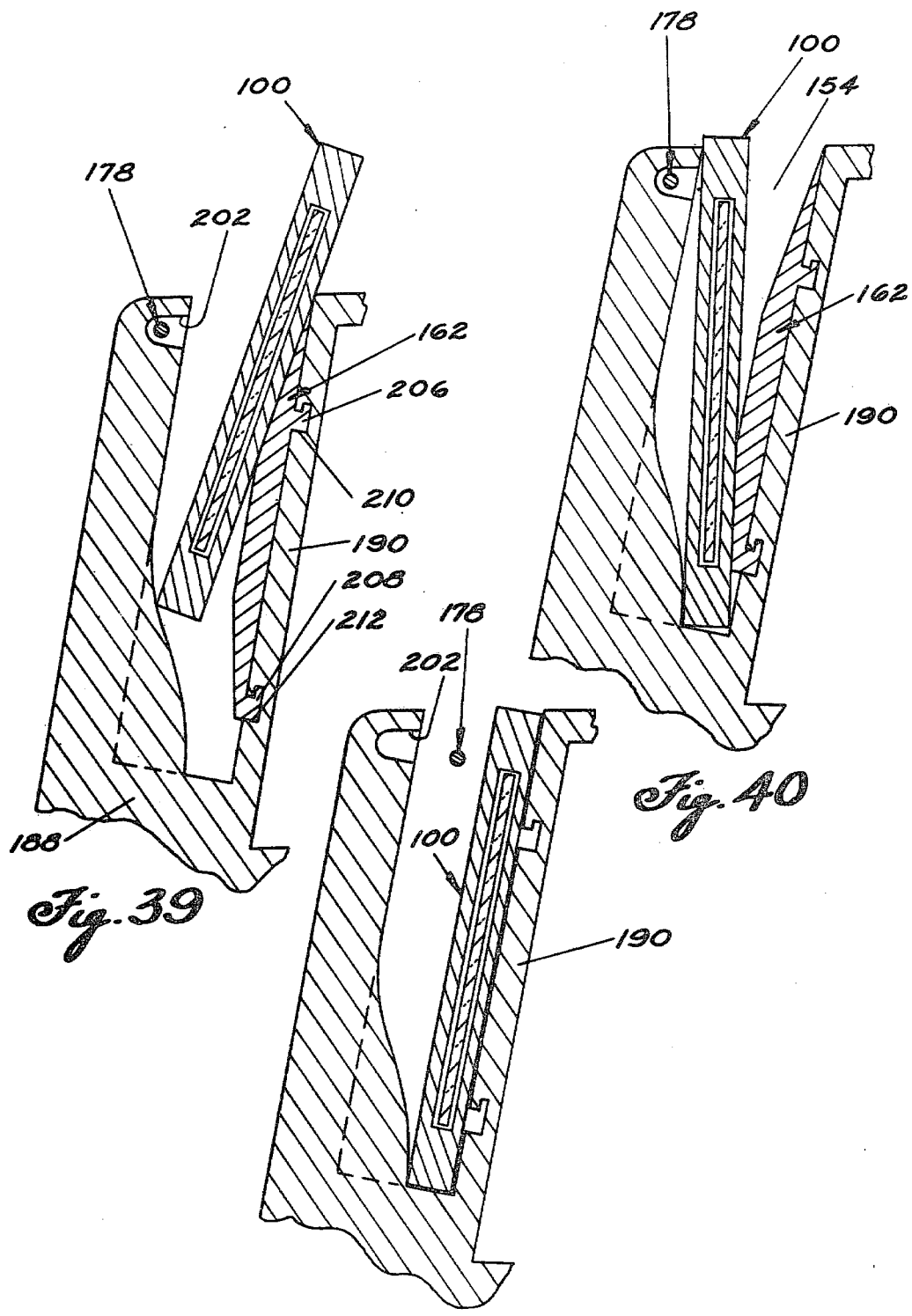

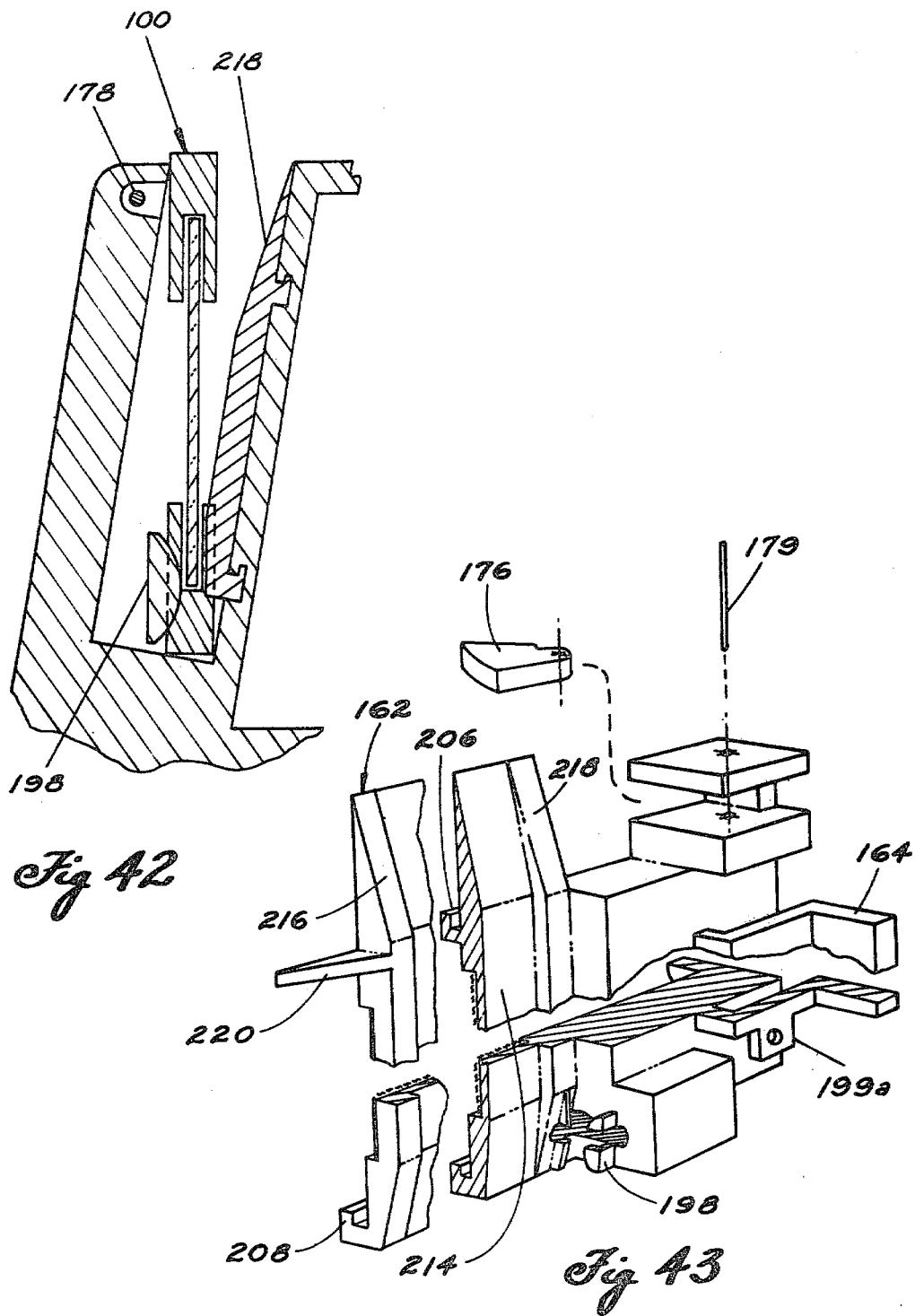

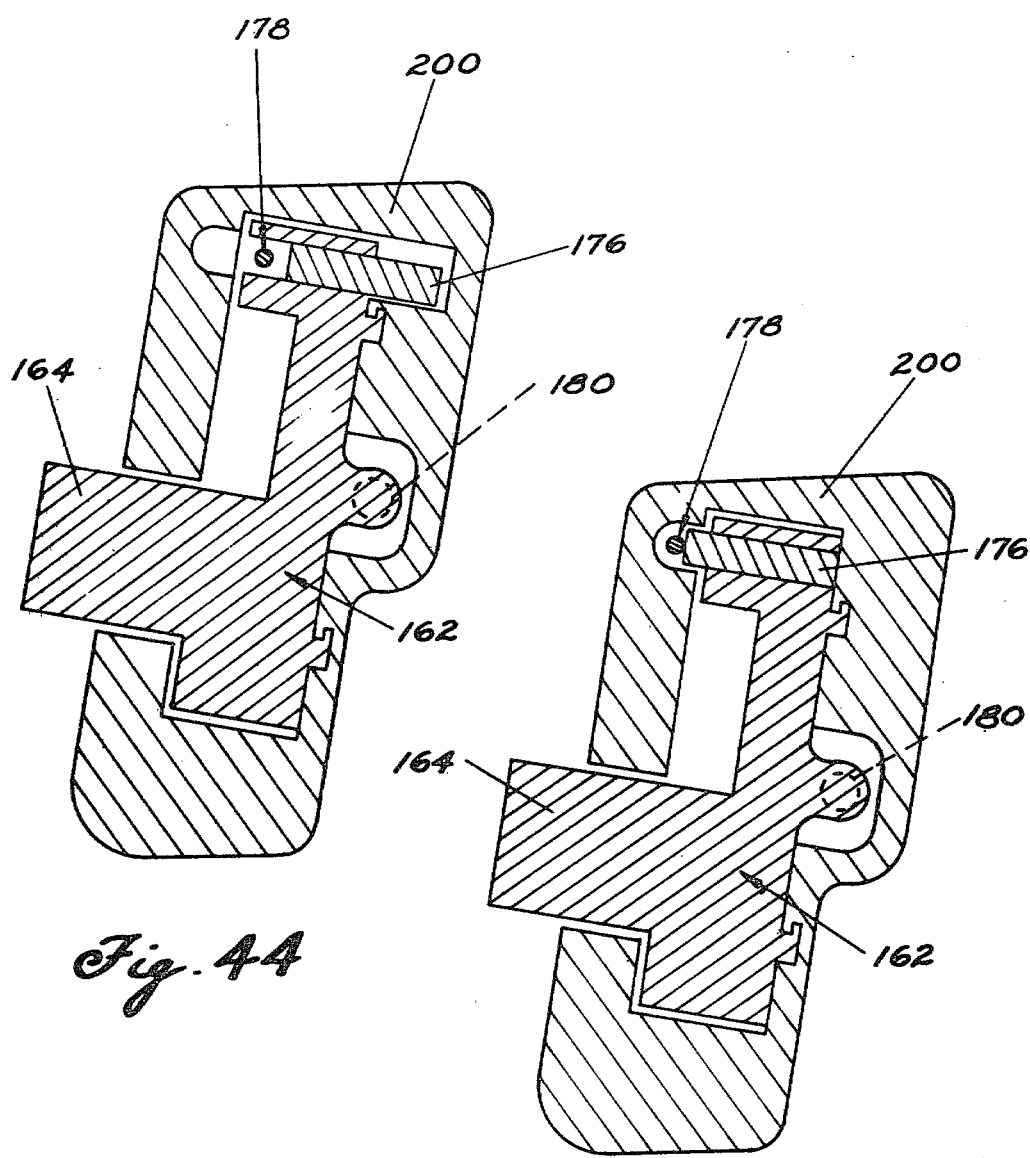

IDENTIFICATION CARD, SENSOR, AND SYSTEM

This is a division, of application Ser. No. 895,011, filed Apr. 10, 1978 now U.S. Pat No. 4,202,120.

BACKGROUND AND SUMMARY OF THE INVENTION

This invention pertains to a novel identification card, sensor, and system.

A primary objective of any credit system which utilizes individual identification cards must be to guarantee that the user of a card is actually authorized to make credit purchases with the card. Current credit card systems are not fool-proof. Lost or stolen cards are used, often with other false identification, to steal and defraud. Recently, credit cards themselves have been forged. The costs of such unlawful acts of course are ultimately borne by legitimate users and represent a considerable sum of money each year. Yet, the usage of credit cards and systems continues to flourish.

Moreover, present day credit card transactions in many instances consume considerable time and effort on the part of both vendor and customer. For example, consider the typical situation in a gasoline station. The purchaser presents the credit card to the attendant who uses it to complete the sales slip. This frequently involves the attendant going from the customer's vehicle to the office and back while the customer in the meantime waits in the vehicle. Even in the newer, self-serve stations the customer will have to get out of his vehicle and still go to the office to complete the transaction.

In one aspect the present invention provides a novel identification card, sensor, and system which utilize thumbprint or fingerprint patterns to confirm that the user of a specific card is in fact authorized to make a credit purchase with the card. The unique construction and arrangement of the identification card of the present invention requires actual presence of the user, and therefore, an unauthorized individual will be precluded from using the card to make a credit purchase. Only in the highly improbable circumstance that an unauthorized individual happens to have a fingerprint pattern exactly like that of the authorized person would the system possibly be fooled. Accordingly, with the present invention enormous amounts of money can be saved to the benefit of legitimate credit card users.

In another aspect the present invention relates to an improved system which, in addition to providing essentially perfect security, eliminates wasted time and effort in completing transactions. By presenting to a credit purchaser a unique sensor into which he inserts his card, a vendor enables a credit transaction to be conducted essentially entirely electronically and with virtually no risk of tendering credit to an unauthorized person.

The foregoing features, advantages, and benefits of the present invention, along with additional ones, will be seen from the ensuing detailed description, claims, and accompanying drawings which disclose an exemplary, but presently preferred, embodiment of the invention in accordance with the best mode presently contemplated in carrying out the invention.

PRIOR ART STATEMENT

A preliminary novelty search conducted in connection with the present invention developed the following U.S. Pat. Nos.: 2,163,777; 2,500,612; 3,287,839; 3,505,954; 3,532,426; 3,584,958; 3,677,623; 3,713,235; 3,762,081; and 3,855,033.

U.S. Pat. No. 2,163,777 discloses an identification device containing a pocket for holding a card on which fingerprints are imprinted.

U.S. Pat. No. 2,500,612 discloses an identification device containing a fingerprint displayed on a transparency within a window.

U.S. Pat. No. 3,287,839 discloses a card having a slide.

U.S. Pat. No. 3,505,954 discloses a card having a key slide.

U.S. Pat. No. 3,532,426 discloses a card having a fingerprint displayed on a transparency within a window.

U.S. Pat. No. 3,584,958 discloses an identification system wherein a machine takes the user's fingerprint and compares it with fingerprint information on a card presented by the user.

U.S. Pat. No. 3,677,623 discloses a fingerprint station containing a transparent plastic tape on which a user's fingerprint is impressed and then erased after comparison.

U.S. Pat. No. 3,713,235 discloses a slide mechanism in a card.

U.S. Pat. No. 3,762,081 discloses a slide mechanism in a card.

U.S. Pat. No. 3,855,033 discloses a credit card containing a window with a photograph.

This Prior Art Statement is being furnished in compliance with the pertinent sections of the Patent and Trademark Office Rules of Practice for Patent Cases and the claimed subject matter hereinafter defined is submitted to be patentable over the art known to applicant.

BRIEF DESCRIPTION OF THE DRAWINGS

FIG. 7 is a plan view of one element of the identification card of FIG. 1 shown by itself.

FIG. 8 is an enlarged sectional view taken in the direction of arrows 8—8 in FIG. 1.

FIG. 9 is an enlarged fragmentary view having a portion broken away illustrating greater detail of FIG. 1.

FIG. 10 is a view similar to FIG. 9 illustrating the second operative position.

FIG. 11 is an enlarged fragmentary sectional view taken in the direction of arrows 11—11 in FIG. 1.

FIG. 12 is an enlarged fragmentary sectional view taken in the direction of arrows 12—12 in FIG. 1.

FIG. 13 is a plan view illustrating one of the elements of the card of FIG. 1 by itself during the fabrication of the identification card.

FIGS. 14 through 20 are sectional views taken in the directions of the corresponding arrows in FIG. 13.

FIG. 37 is an enlarged sectional view taken in the direction of arrows 37—37 in FIG. 24.

FIG. 38 is a view similar to FIG. 37 but with the assembly in the position shown in FIG. 25.

FIG. 39 is a view similar to FIG. 41 but illustrating a different position.

FIG. 40 is a view similar to FIGS. 41 and 39 but illustrating a different position.

FIG. 41 is an enlarged sectional view taken in the direction of arrows 41—41 in FIG. 32.

FIG. 42 is an enlarged sectional view taken in the direction of arrows 42—42 in FIG. 33.

FIG. 43 is a fragmentary perspective view of a portion of the sensor.

FIG. 44 is an enlarged sectional view taken in the direction of arrows 44—44 in FIG. 27.

FIG. 45 is a view similar to FIG. 44 but showing a different position.

DESCRIPTION OF THE PREFERRED EMBODIMENT

Identification Card

FIGS. 1 through 6 and 8 through 12 illustrate an identification card 100 embodying principles of the present invention. The disclosed identification card is of two element construction comprising a first element 102 and a second element 104. Element 104 is shown by itself in FIG. 7, and details of element 102 are shown in FIGS. 13 through 20 prior to completion of the finished credit card 100. Preferably each element 102, 104 is made from a suitable plastic material; however, the fabrication process will be described in greater detail later.

Figure 1:
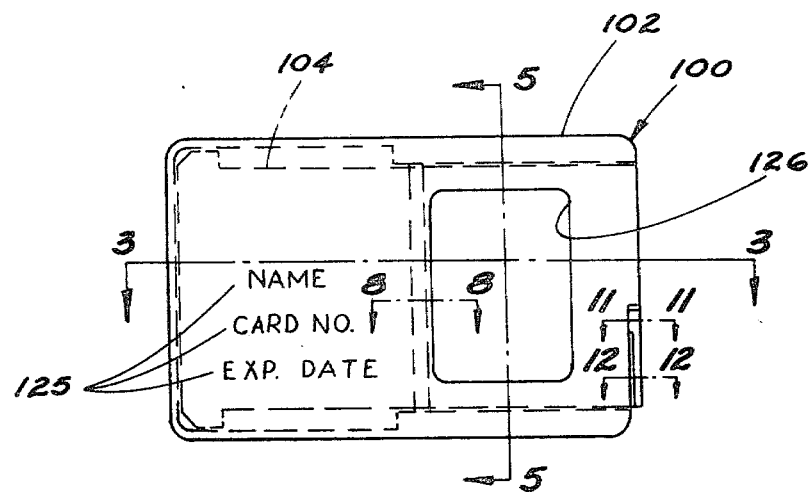
FIG. 1 is a plan view of an identification card according to the present invention showing a first operative position.
Figure 2:
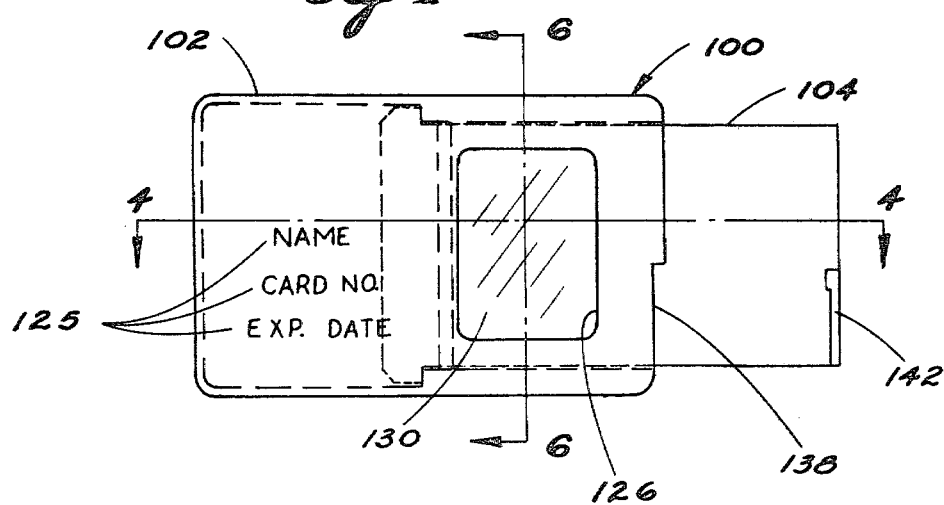
FIG. 2 is a view similar to FIG. 1 showing a second operative position.
Figure 3:
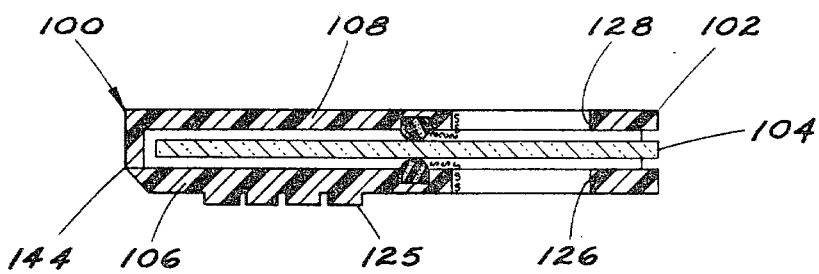
FIG. 3 is a sectional view taken in the direction of arrows 3—3 in FIG. 1.
Figure 4:
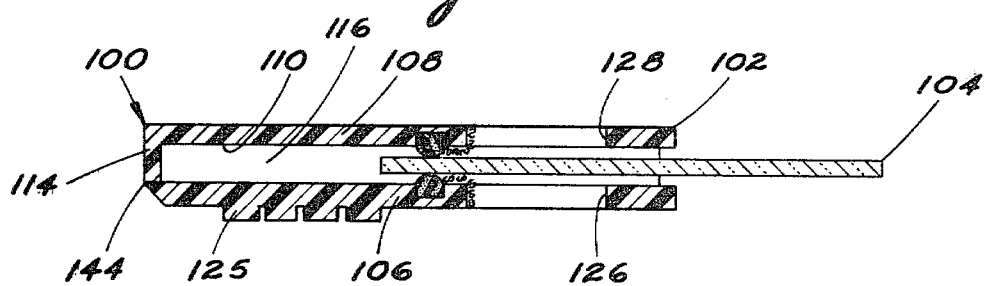
FIG. 4 is a sectional view taken in the direction of arrows 4—4 in FIG. 2.
Figure 5:
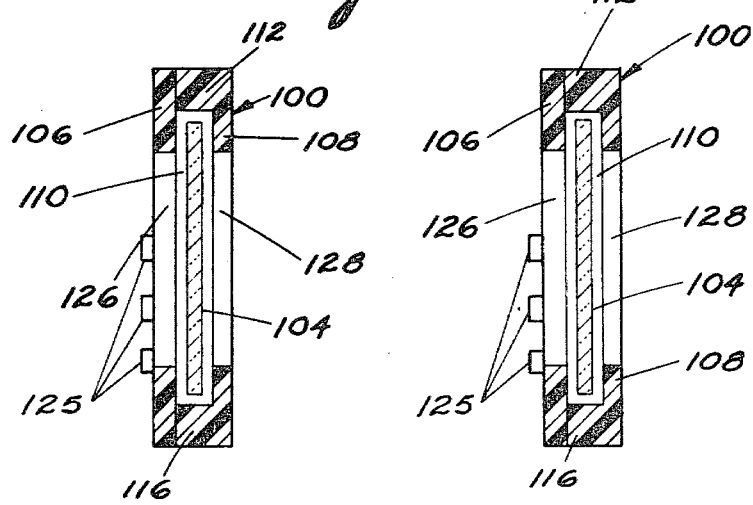
FIG. 5 is a sectional view taken in the direction of arrows 5—5 in FIG. 1.
Figure 6:
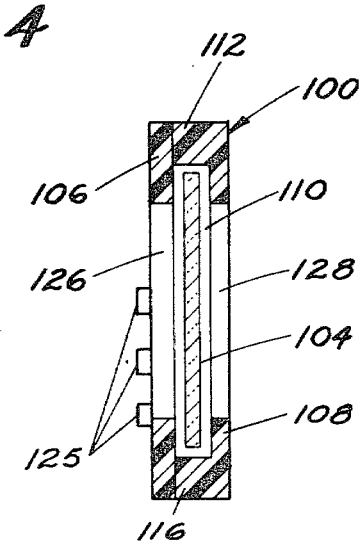
FIG. 6 is a sectional view taken in the direction of arrows 6—6 in FIG. 2.

Element 102 is of generally rectangular shape in plan and comprises a generally rectangular anterior wall 106 which overlies a corresponding posterior wall 108. As viewed in FIG. 1, walls 106, 108 are joined together around three sides, namely the top, bottom and left-hand sides. The right-hand sides of the two walls are not joined. A large generally rectangular pocket 110 is fashioned in the interior surface of wall 108 and is of almost the same size as wall 108 itself. The shape of the pocket is best seen FIG. 13. Pocket 110 is open at its right-hand side, but is bounded along its other three sides by raised, or thickened edge sections 112, 114, and 116. The edge sections 112, 116 are parallel and include respective shoulders 118, 120 directly opposite each other so that the portions of edge sections 112, 116 to the left of the two shoulders are slightly farther apart than are the portions to the right of the two shoulders. In the completed identification card 100, element 104 is disposed in pocket 110 between walls 106, 108 and can be displaced to the right and left with respect to element 102 between first and second operative positions. FIG. 1 illustrates the first operative position with element 104 displaced fully to the left with respect to element 102, and FIG. 2, the second operative position with element 104 displaced fully to the right.

Element 104 is of generally rectangular shape and includes two protuberances 122, 124 at the two left-hand corners thereof. Element 104 is dimensioned relative to pocket 110 for a free, but fairly close sliding fit between the first and second operative positions. Protuberances 122, 124 abut shoulders 118, 120 when element 104 is in the second operative position to prevent element 104 from being removed from element 102 via the open right-hand side of the latter element. Abutment of the left-hand edge of the element 104 with segment 114 occurs in the first operative position.

The exterior surface of wall 106 contains selected information such as the name of the authorized user of the identification card, the card (i.e. account) number, and the expiration date. These may take the form of raised, or embossed, indicia 125 for use with conventional equipment which is used to impress the indicia on the card onto a sales slip. (It will be seen hereinafter that the sensor of the present invention is preferred for use with the identification card of the present invention; however, the indicia on the card advantageously render it useful with conventional equipment.)

Element 102 is further provided with a pair of rectangular apertures 126, 128 in walls 106, 108 respectively. The apertures are of the same size and register with each other. Element 104, being disposed between walls 106, 108, will have that portion thereof which is in registry with apertures 126, 128 visible from either the anterior or posterior side of the credit card. Pursuant to principles of the invention element 104 is provided with a transparent window 130 which registers with apertures 126, 128 only when element 104 is in the second (i.e. FIG. 2) operative position. The portion 129 of element 104 (to the right window 130) which registers with the apertures 126, 128 when element 104 is in the first operative position is non-transparent.

It may now be explained that the first (i.e. FIG. 1) operative position represents the usual position of the two elements 102, 104 when the identification card is not in use. In this position element 104 is fully inserted into element 102, and the non-transparent portion of element 104 is visible through apertures 126, 128. The overall size of the card in the non-use position corresponds to that of conventional credit cards, the thickness of the identification card 100 possibly being slightly greater. The second (i.e. FIG. 2) operative position represents the position of the two elements 102, 104 when the identification card is in use. In this position element 104 is fully extended from element 102, and window 130 registers with apertures 126, 128. With the card in the in-use position the user can place one of his digits, preferably his thumb, on window 130 via aperture 126, and the print thereof can be seen via the other aperture 128. As will be explained in greater detail hereinafter in connection with the description of the sensor of the present invention, the print can be electronically scanned to confirm the identity of the authorized user or alternatively to detect an unauthorized user. After use, the element 104 is returned to the first operative position before removal from the sensor. An advantageous feature of the identification card is obtained by providing a means for wiping the print from the window when the element 104 is being returned to the non-use position. A cleaning, or wiping, insert 134 is secured on identification card element 102 to wipe the print from the anterior surface of window 130. Insert 134 may take the illustrated form of a strip of squeegee-like material located immediately adjacent to the left-hand edge of aperture 126 and extending in element 102 a minimum of the full height of window 130. Also, the material of insert 134 is impregnated with a cleaning material with a life expectancy equal to an annual card renewal cycle under average conditions of use. Element 132 acts as a dust seal to preserve the effectiveness of the squeegee insert 134. Element 132 is secured by means of lodging insert 134 into groove 136 and retaining one end of element 132 securely in place. The other end of element 132 is securely chemically or mechanically bonded to element 102 at the aperture opening 126. It is preferable to provide wiping for the posterior surface of window 130, as by an identical wiping arrangement at aperture 128 comprising insert 134′, element 132′, and groove 136′. It should be mentioned at this point that element 102 is provided with two notches 138, 140 at the lower right-hand corners of walls 106, 108 respectively and that element 104 is provided with a protuberance 142 at the lower right-hand corner thereof. The purpose of the notches 138, 140 and the protuberance 142 will be explained later in connection with the description of the sensor.

Figure 21:
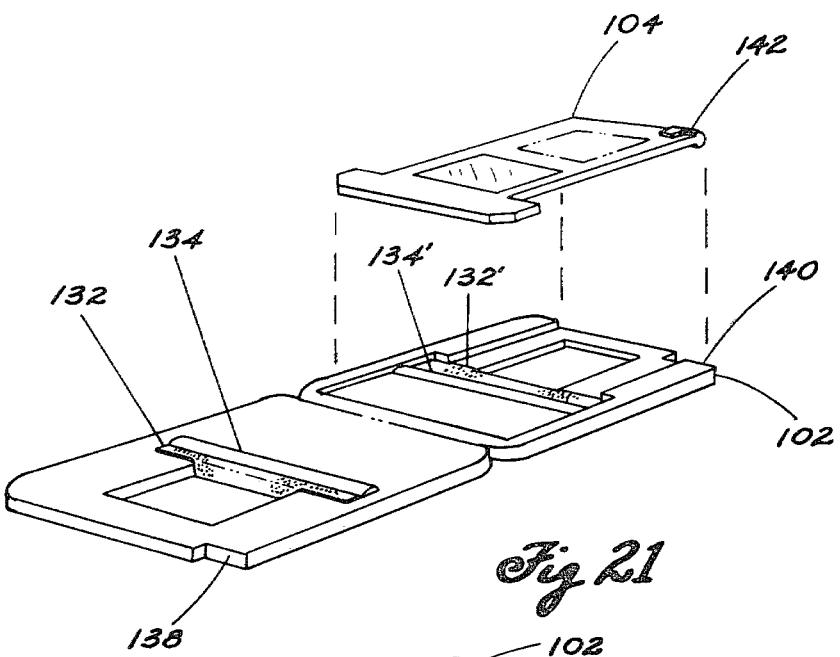
FIGS. 21 and 22 are perspective views illustrating steps in the fabrication of the identification card of FIG. 1.
Figure 22:
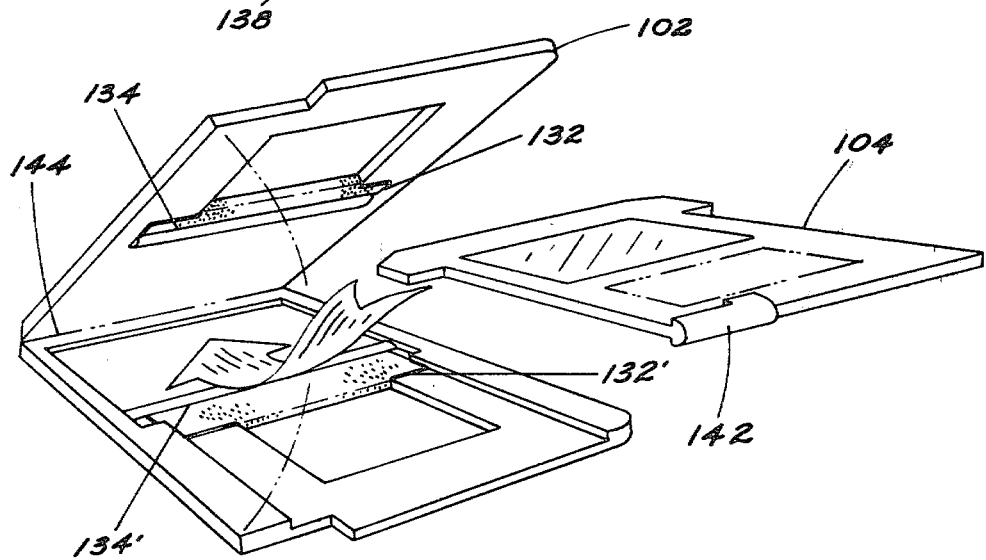

The steps in the fabrication of credit card 100 can be explained with reference to FIGS. 13, 14, 21 and 22. Consideration will first be given to element 102 as viewed in FIGS. 13 and 14. Element 102 can be made by first producing a plastic piece in the shape and form shown in FIGS. 13 and 14. The anterior and posterior walls 106, 108 are at this stage joined solely by a narrow web of material forming what is sometimes called a "living hinge". This is indicated by the numeral 144 in FIGS. 13 and 14. As shown in FIGS. 21 and 22, the other elements 132, 132′ and 134, 134′ of the identification card are assembled into element 102, element 104 is inserted, (FIGS. 21 and 22) and then the two walls 106, 108 are folded onto each other about the axis of the living hinge 144. The upper and lower edges of walls 106, 108 are secured together as by staking, heat sealing, ultrasonic welding, or any other suitable technique. Element 102 may be made from any suitable plastic and polypropylene is satisfactory. Element 104 may be made from a transparent plastic, such as clear acrylic or mylar type material, and the non-transparent portions thereof may be formed by a suitable mask securely bonded, fused or otherwise applied to one of the surfaces of element 104.

Usage of Card 100 in a Sensor

Figures 23, 36:
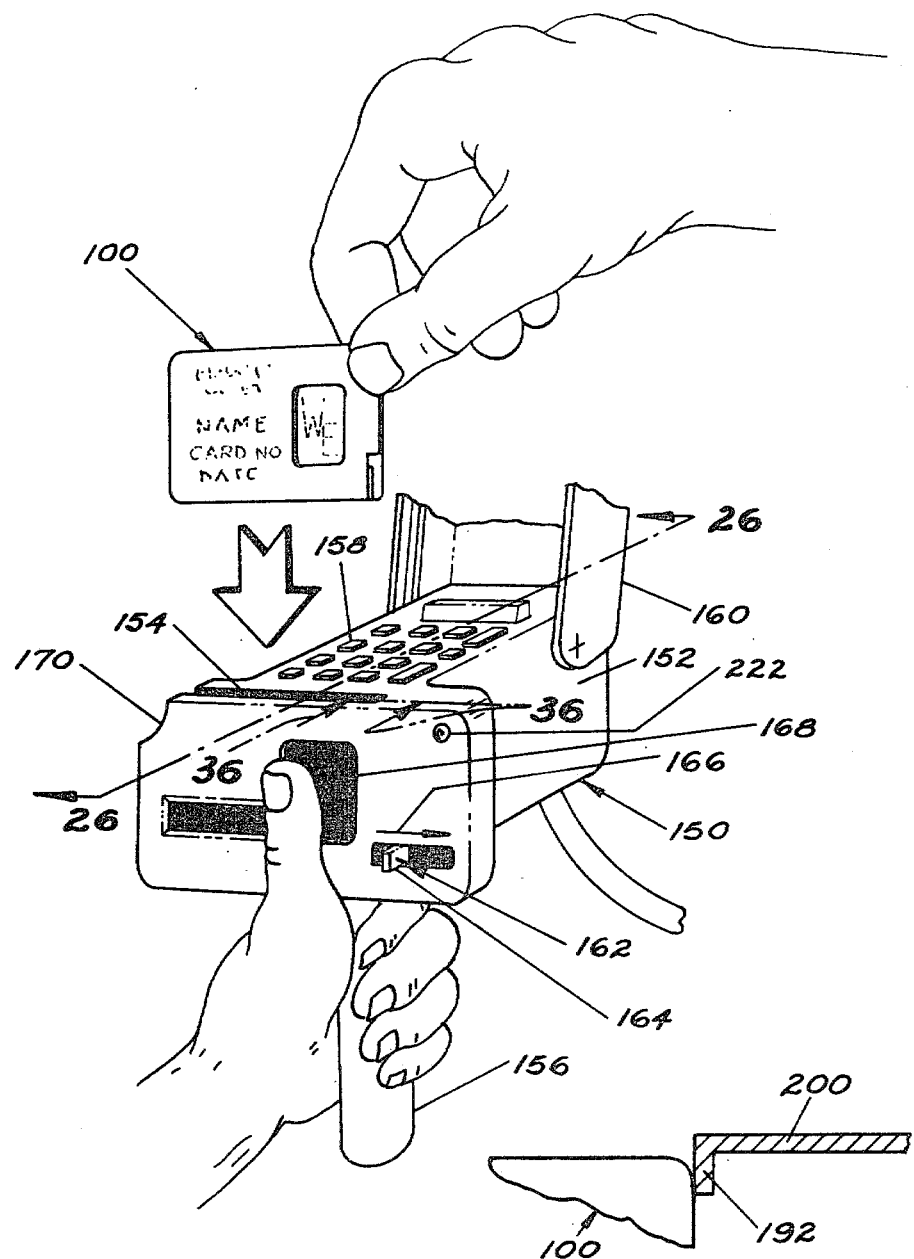
FIG. 23 is a perspective view of a sensor embodying principles of the present invention with which the card of the present invention is used.
FIG. 36 is an enlarged fragmentary sectional view taken in the direction of arrows 36—36 in FIG. 23.
Figure 24:
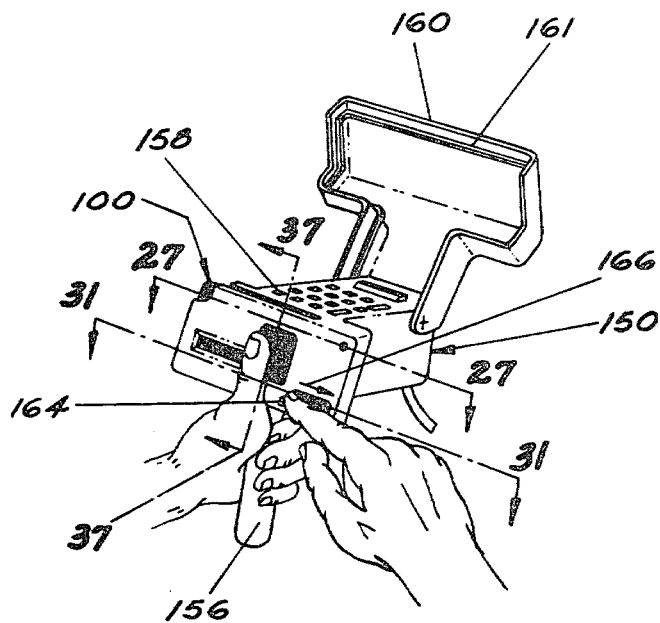
FIG. 24 is a perspective view, similar to FIG. 23, illustrating one step in the sequence of usage.
Figure 25:
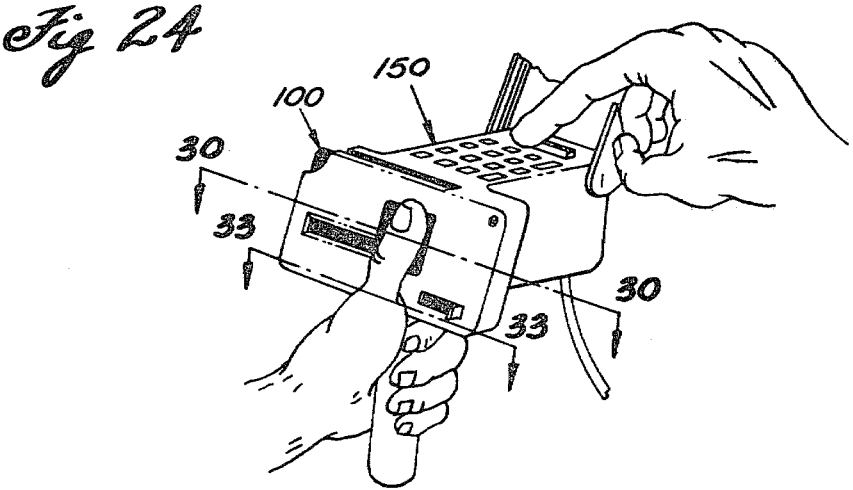
FIG. 25 is a perspective view, similar to FIG. 24, illustrating a subsequent step in the sequence of usage.
Figure 26:
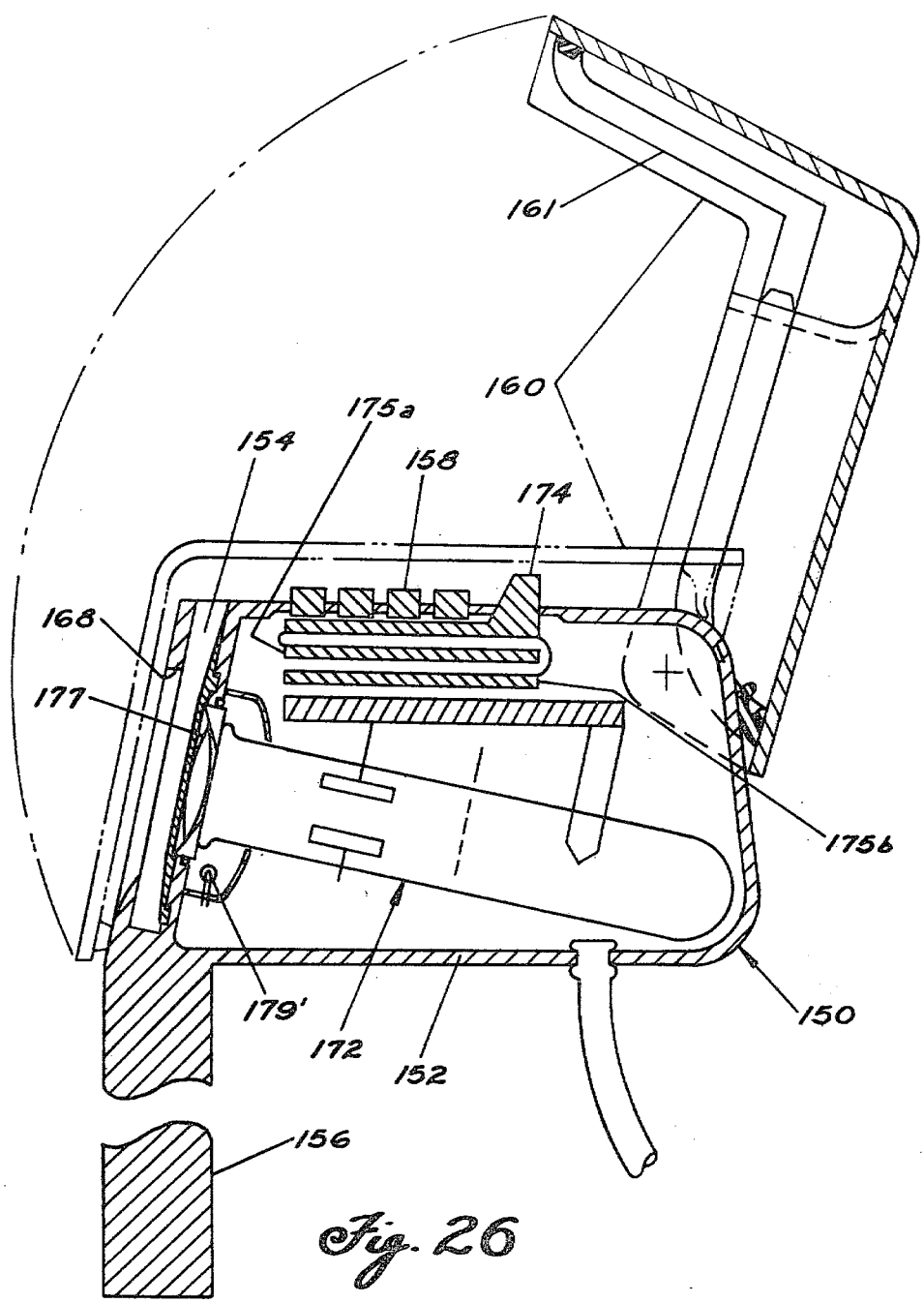
FIG. 26 is an enlarged sectional view taken in the direction of arrows 26—26 in FIG. 23.

FIGS. 23–25 illustrate a sequence of steps in usage of card 100 in conjunction with a sensor 150 embodying principles of the present invention. Although sensor 150 will be described in greater detail hereinafter, briefly it comprises a housing 152 including a receptacle 154 for card 100, a handle 156, a keyboard 158, and a cover 160. As shown in FIG. 23, a user manually grasps the sensor by means of handle 156. (The illustrated embodiment is designed with the intent that it will be grasped by the left hand of the user, and it should be understood that the design is exemplary for purposes of illustrating the broad principles of the invention and is not to be construed as limiting the scope of the invention.) When the sensor is not in use, cover 160 is closed on housing 152 (broken line position of FIG. 26). A weatherstrip 161 is provided on cover 160 to seal with the housing and render the receptacle 154 and keyboard 158 weatherproof. When the sensor is put to use, cover 160 is disposed to a position where the user can insert card 100 into receptacle 154 by means of his right hand. The user fully inserts card 100 into the receptacle and then, as shown in FIG. 24, operates a slide 162 by pushing the protruding slide actuating tab 164 to the right as indicated by the arrow 166. The sensor includes a mechanism (hereinafter described) which engages protuberance 142 of card 100 for withdrawing card element 104 from the card as actuating tab 164 is slid to the right of the user. Housing 152 includes an aperture 168 which registers with the apertures 126 and 128 of card 100. When tab 164 has been slid the maximum distance to the right, the window 130 of card element 104 is in registry with apertures 126, 128, and hence also with aperture 168. Now the user can impress his left thumb against the anterior face of window 130 (see FIG. 25) so that his thumbprint pattern can be electronically scanned by the sensor and associated apparatus to verify that the user is in fact authorized to possess the card. If verification occurs, the transaction is allowed to be completed. If not, an alarm or other suitable indication is given to an attendant. Keyboard 158 is used to enter data concerning the transaction, such as for example the amount of the credit purchase, the user's identification number, and the code number of the sensor. In order to remove card 100, tab 164 is slid fully to the left to similarly fully reinsert element 104 back into the card. Thumb and finger clearance 170 is provided in housing 152 at the upper left hand corner of receptacle 154 to permit the user to grasp the upper left hand corner of card 100 for removing the card from the sensor. This completes a brief description of the typical steps in usage of card 100 in sensor 150. Attention is next directed to details of sensor 150.

Details of Sensor 150

Figure 31:
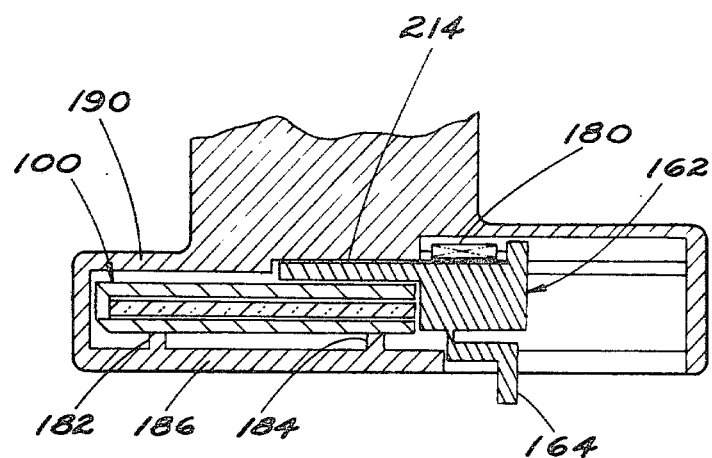
FIG. 31 is an enlarged sectional view taken in the direction of arrows 31—31 in FIG. 24.
Figure 32:
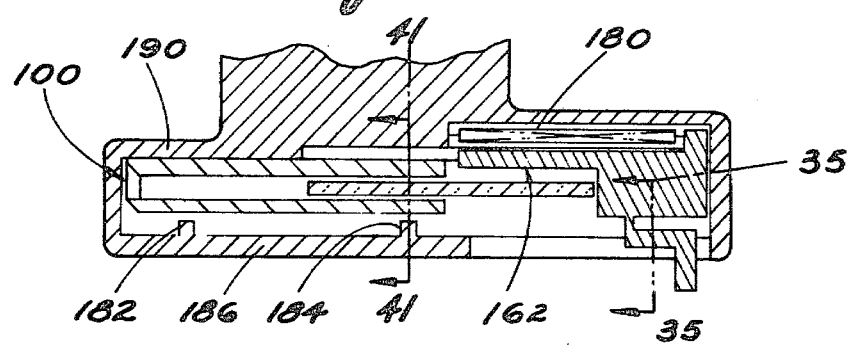
FIG. 32 is a view similar to FIG. 31 but with the assembly in the position shown in FIG. 25.
Figure 33:
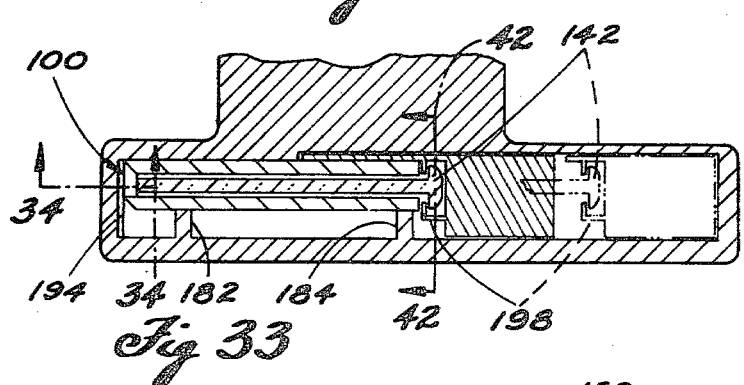
FIG. 33 is an enlarged sectional view taken in the direction of arrows 33—33 in FIG. 25.

FIGS. 26 through 45 show further details of sensor 150. In addition to those sensor elements already briefly described in the preceding section, sensor 150 comprises: a scanner 172 and associated apparatus for scanning the user's thumbprint or fingerprint; an electronic circuit board assembly 174 containing circuitry associated with keyboard 158; additional circuit board assemblies 175a, 175b; a cam 176; a lever 178; a pin 179; and a return spring 180. Scanner 172 and associated apparatus are perhaps best seen in FIG. 26, as are the electronic circuit board assemblies also. Cam 176, lever 178, pin 179, and spring 180 are operatively associated with slide 162. Slide 162, cam 176 and pin 179 are shown in perspective in FIG. 43. Lever 178 and cam 176 appear in several views, perhaps being best seen in FIGS. 27 and 28. Spring 180 can be seen in FIGS. 31 and 32.

Figure 34:
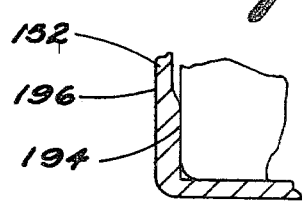
FIG. 34 is a fragmentary sectional view taken in the direction of arrows 34—34 in FIG. 33.
Figure 35:
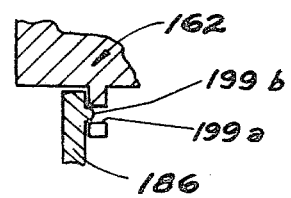
FIG. 35 is a fragmentary sectional view taken in the direction of arrows 35—35 in FIG. 32.

In explaining the details of sensor 150 it is appropriate to first consider the design of receptacle 154. The receptacle is of generally rectangular shape and in plan just slightly larger than card 100 in plan. The thickness of the receptacle however is somewhat greater than that of card 100. The full thickness of the receptacle exists along the full length of the open upper edge of the receptacle to affor easy insertion of the bottom edge of the card. As can be seen in FIGS. 33 and 39-41, a pair of laterlly spaced guides 182, 184 on the anterior housing wall 186 extend into receptacle 154. The guides begin about half way down the receptacle wall 188. The guides are shown to be of a curved shape and serve to guide the bottom edge of card 100 during insertion thereof into the receptacle. (FIG. 39). When the card is fully inserted, the lower anterior edge of the card contacts bottom wall 188 and the bottom posterior edge of the posterior wall of card 100 is substantially disposed against the posterior wall 190 of the receptacle near bottom wall 188, as shown in FIG. 40. (A portion of slide 162 appears in FIGS. 39 and 40 and facilitates the orientation of card 100 in the position of FIG. 40). Card 100 is also located laterally in the receptacle by means of locating elements shown in FIGS. 34 and 36. Locating element 192 in FIG. 36 is designed to engage the lateral right hand edge of card 100 adjacent the upper corner thereof; however, it does not interfere with the withdrawal of element 104 from card 100. Locating element 194 in FIG. 34 is designed as a slight enlargement of the thickness of the left hand lateral receptacle wall 196 adjacent the bottom of the receptacle and is designed to engage the lateral left hand edge of card 100 adjacent the lower corner thereof. The lateral dimension between locating elements 192 and 194 is preferably just large enough to comfortably accomodate the lateral dimension of card element 102 for free insertion of the card into and removal from the receptacle.

The purpose of providing the notches 138, 140 and protuberance 142 at the lower right hand corner of card 100 can now be appreciated. Because the card is accurately located during its insertion into the receptacle, protuberance 142 can be, during the insertion process, accurately guided into interlocking engagement with slide 162. Directing attention for the moment to FIG. 43, one can see that slide 162 is provided with an integral connector 198 for interlocking connection with protuberance 142. It can also be seen in the drawings from the design of protuberance 142 that the latter lodges into interlocking engagement with the former as the card becomes fully inserted into the receptacle. When such interlocking engagement is attained (see FIG. 33), lateral displacement of slide 162 similarly laterally displaces card element 104 with respect to card element 102, the latter card element being constrained laterally by locating elements 192, 194. It should also be pointed out that the top wall 200 of the sensor overlies card element 104 when same is extended from element 102, and this prevents the card from being removed from the receptacle unless element 104 is fully reinserted into element 102. Return spring 180 is connected between slide 162 and the sensor housing to exert a restoring force tending to restore the slide to the left as it is being slid to the right during withdrawal of element 104 from the card. A detent arrangement in the form of a small hole 199a in the slide and a button 199b on the housing (see FIG. 35) is provided to retain slide 162 in position against the force of spring 180 after the slide has been slid fully to the right. The detent can be readily disengaged by the user sliding tab 164 to the left after the scanning has been completed. When element 104 is fully reinserted back into element 102, the card may be removed from the sensor in the manner explained above with the protuberance 142 disengaging from connector 198.

Figure 27:
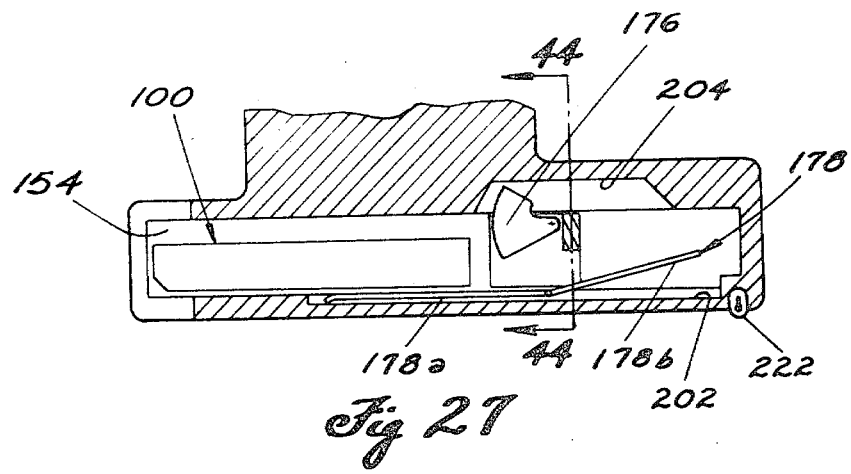
FIG. 27 is an enlarged sectional view taken in the direction of arrows 27—27 in FIG. 24.
Figure 28:
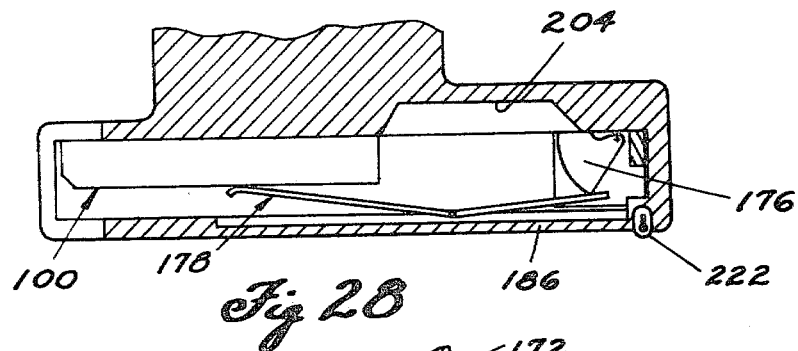
FIG. 28 is a view similar to FIG. 27 but with the assembly in the position shown in FIG. 25.
Figure 29:
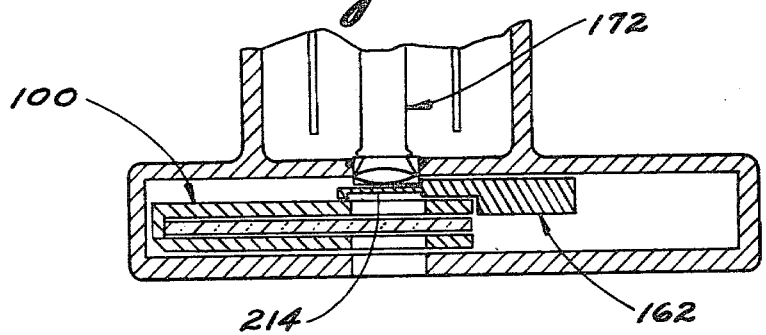
FIG. 29 is a view similar to FIG. 30 but with the assembly in the position shown in FIG. 24.
Figure 30:
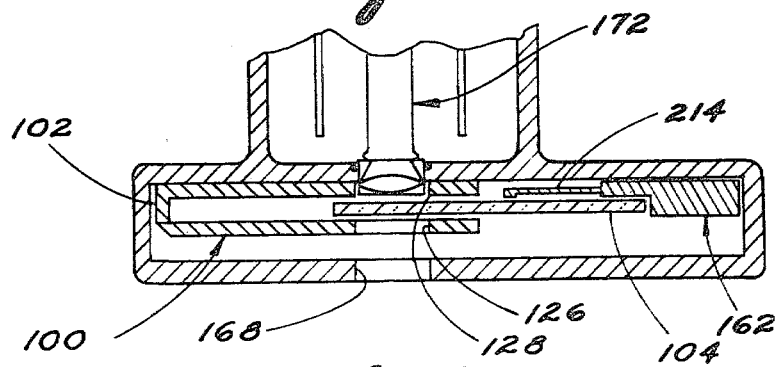
FIG. 30 is an enlarged sectional view taken in the direction of arrows 30—30 in FIG. 25.

In order to achieve an optimum arrangement for scanning the user's thumb or fingerprint, the design of sensor 150 accomplishes a further manipulation of card 100 as slide 162 is slid to the right to withdraw element 104 from the card. The purpose of this manipulation is to place the window 130 of the card element 104 flat against the face of the scanner, and the manipulation is accomplished with the aid of cam 176 and lever 178. As shown in FIGS. 27, 28, and 43 cam 176 is pivotally mounted on slide 162 by means of the pivot pin 179. Lever 178 comprises two lever arms 178a, 178b disposed at an obtuse angle, lever arm 178a being disposed for engagement with the anterior face of card 100 and lever arm 178b being disposed for engagement by cam 176. A lateral groove 202 is provided to receiver lever 178. FIG. 27 illustrates the position of the lever arm and cam after card 100 has been inserted into the sensor receptacle and before slide 162 has been actuated to begin withdrawing element 104. It will be observed that a lateral groove 204 has been provided in wall 190. As slide 162 is displaced to the right, cam 176 engages the beveled right hand edge of this groove to cause the cam to increasingly pivot in the counterclockwise direction (as viewed in FIGS. 27 and 28) as the slide is slid further to the right. As the cam pivots, it engages lever arm 178b to cause the lever to rotate in the clockwise direction. The clockwise rotation of lever arm 178a in turn urges the card posteriorly of the receptacle to bring the posterior card wall flat against the posterior receptacle wall 190. FIG. 28 illustrates this position after slide 162 has been slid fully to the right to withdraw element 104. FIGS. 29, 30, 37, and 38 are also of interest in connection with the manipulation of card 100 and serve to illustrate how the face of the scanner is brought against window 130 as the card is manipulated by the action of lever 178. FIGS. 44 and 45 are also of interest in showing the action of cam 176 and lever 178.

As shown in FIG. 43, slide 162 may be a one piece element having a plurality of different sections used for different purposes in the operation of the sensor. Some of these sections, such as the tab 164, connector 198, and the detent hole have already been described. The posterior face of the slide contains two parallel rails 206, 208 which engage correspondingly shaped guide tracks 210, 212 provided in wall 190 to guide the slide for lateral displacement on the sensor housing. A solid cover section 214 serves to protectively cover the scanner face when the sensor is not in use, but is displaced to reveal the scanner face when the slide is slid to the right. It is desirable to use a piece of soft material 215 (FIG. 37) adhered to the slide to protect the face of the scanner when the slide is operated. A pair of laterally spaced card guides 216, 218 are provided in the anterior face of cover 214 to guide the card into the receptacle, as explained above. (See FIGS. 39-41.) When the slide is moved to the right these guides clear the card to permit the card to be manipulated by lever 178 against the posterior receptacle wall and bring window 130 against the scanner face. A wedge 220 points laterally to the left at the left hand edge of the slide. The wedge serves to dislodge the card from against the posterior receptacle wall when the slide is returned to the left to reinsert card element 104 back into the card.

The scanner 172 and associated apparatus (FIGS. 37, 38) include a conventional scanner tube and associated electrical circuitry. Such equipment is commercially manufactured by several companies including Rockwell International and Calspan Technology Products, Inc. It may be desirable to use a Fresnel lens 177 for suitably focusing the print being scanned as well as a lamp 179' for illuminating the print. The circuit board 174 is associated with keyboard 158 and is like that used in conventional "pocket calculators" whereby electronic signals are developed which are representative of the decimal number which is entered via the keyboard. The circuit board 175a is a "transaction" board which is coupled with board 174 to receive from board 174, and in turn to transmit, the amount of the transaction which has been entered on the keyboard. The circuit board 175b is a "card" board which is coupled with board 174 to receive from board 174, and in turn to transmit, the number which has been assigned to the card, this number also being entered on the keyboard. An indicator, such as a lamp 222, (FIGS. 27, 28) is also provided on the sensor to indicate the status of a transaction. For example, the lamp may be illuminated steadily once the card has been properly inserted into the receptacle, the card element 104 extracted, and the user's print is ready to be scanned. During scanning the lamp may blink, and once the scanning has been completed the lamp may return to a steady illumination. Alternately, or in addition, an audible tone may be given concurrently with energization of the lamp. Before describing in detail an example of a transaction, attention is directed to FIG. 46 which illustrates a possible system embodying principles of the invention.

Figure 46:
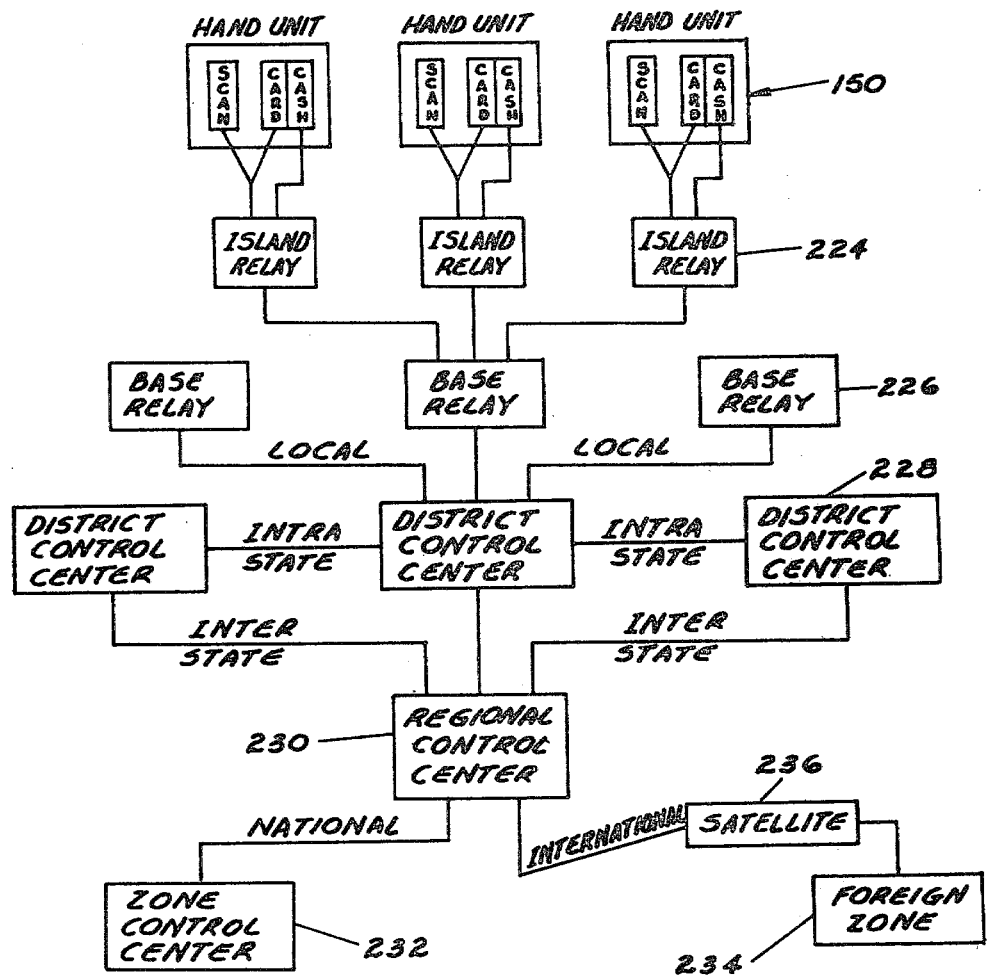
FIG. 46 is a block diagram illustrating the overall system of the present invention.

In FIG. 46 a number of sensors 150 are each associated with a corresponding island relay 224. The island relays 224 in turn are associated with a base relay 226. The base relay 226 along with other similar base relays are associated with a district control center 228. The district control center 228 and other similar district control centers may be associated with a regional control center 230. Further association may be had with a national zone control center 232 and with foreign zones 234, as by satellite 236, to provide international capability. Where the invention is used in a gasoline station application authorizing and for recording credit purchases, the sensors 150 may be provided at each pump. An island relay 224 would be provided at each island, and the base relay 226 would be at the gasoline station office. The district control center 228 would be linked to all base relays in the district. The district control center 228 would contain fingerprint or thumbprint records for all authorized card holders within the district. Each record print would be correlated with the number of the card issued to that person. Thus, in use the person presenting the card would enter the card number on the keyboard of the sensor and place his thumb or finger on the window for scanning by the sensor. The sensor would be linked with the district control center and the record print corresponding to the card number would be compared to the print being scanned by the sensor. If a match between the two is obtained an indication is transmitted back to the station allowing the transaction to be completed. Then the amount of the transaction is entered on the keyboard and transmitted to the base relay and the district control center. A record is made in the base relay and the district control center of the transaction, including the card number, the vending station number, and the amount of the transaction. Should a match not be obtained, a suitable indication can be given which will require the attention of the station attendant before the transaction can proceed. There may be situations where the authorized user is unable to cause his print to match the record print, and in such cases, the station attendant can verify the user's identity by other means. For example, if the user injured his thumb or finger, he would be unable to cause a match, yet he would legitimately be entitled to proceed with the credit transaction. If desired, two record prints could be on file for each authorized person, but this would require twice the record storage capacity. The regional control center would provide for situations where the card in use has been issued to a person who does not reside in the district. Similarly, for the national and foreign zones.

A typical transaction would be as follows. A user inserts his card into a sensor and operates the sensor to reveal the transparent card window. He now enters the card number on the keyboard to establish communication with the appropriate control center. A suitable switch may be provided on the sensor and is in the "card" position while the card number is being entered to cause the card number to be stored in the circuitry of the "card" circuit board assembly and then transmitted to the appropriate control center. The control center can now scan its records for the record print which is correlated with the card number which has been received. The user has placed his print on the card window, and the scanner now scans the print and transmits the print data to the control center. The control center thereby compares the scan data with the record print data. The lamp 222 blinks during the scan to indicate that the comparison is in progress. At the conclusion of the scan, an indication is given as to the result of the comparison. Assuming that the user's identity is confirmed, the transaction is allowed to proceed. The switch referred to above may now be placed in the "cash" position while the amount of the purchase is being entered on the keyboard to cause the amount to be stored in the circuitry of the "transaction" circuit board assembly and then transmitted to the control center. Typically, the attendant would enter the cost of individual purchases such as gas, oil, etc., and the total would be automatically computed by the electronics. Thus, the amount of the purchase is recorded in the control center under the user's account. Also recorded in the control center is a code identifying the vending location of the sensor so that the vendor's account may be credited. The vendor's code could be entered via the keyboard and an additional circuit board, or could automatically be entered when the communication is established between the sensor and the control center. For the vendor's own record, the transaction is also recorded in the base relay 226. So that the customer can have a receipt, a suitable mechanism, such as a printer, is provided in the island relay 224 to give a receipt showing the transaction details.

It is contemplated that various modifications may be made to the system. In the illustrated embodiment a window is provided in the anterior sensor wall to permit the user to read the card number after the card has been inserted into the sensor. Alternately, provision could be made for automatically reading the card number from the card, such as by magnetically reading the magnetically recorded number on the card (as is done with commercial checking accounts). While it would be possible to standardize the system by always using a selected print (for example the left thumbprint), it may be desirable to provide for extra alternate prints. Also it may be desirable to permit more than one individual to use a given card and this can be accomplished by recording all authorized users' prints under the single card number and comparing a scanned print against all such record prints. As noted earlier there may be situations where it is impossible to match the user's print, yet the user is legitimately authorized to use the card. In such situations, a signel can be given to an attendant who can then confirm the user's identity by other identification. Once such confirmation is attained, the station attendant can enter a signal which will allow the transaction to proceed and be recorded with the indication that the attendant authorized the transaction.

Other annunciator schemes for indicating the status of a transaction as it proceeds are possible, and it will therefore be appreciated that the illustrated embodiment of the lamp and audible tone is merely one possibility of many. It may be desirable to use a sensing device to show that the card has been properly inserted into the receptacle before the user attempts to operate the slide. This could be accomplished by a microswitch mechanism which senses a card in the correct position in the receptacle and then lights a light to show the user that the slide can be operated. It is also possible to provide for automatic extraction and reinsertion of the card element 104 by means of a suitable power actuator device which would be operative when the card has been inserted. This would eliminate the need for the user to manually operate the slide 162.

While reading the foregoing description, one may be reminded of various fingerprint identification schemes such as the Finder system used by the F.B.I. It is important to recognize that the present invention envisions a much less complex scheme for proving (or disproving) identification. With the present invention the user's print is compared only against the record print, or prints, which is, or are, recorded under the corresponding identification (or account) number. In other words, there is no need to compare the user's print with every print on record in the central file. Moreover, it is contemplated that identity can be proven (or disproven) with a minimum number of identification points on each print. Thus, an absolute minimum amount of scanning is required, enabling a transaction to be accomplished with comparative simplicity and expediency.

In conclusion, the invention provides a novel identification card, sensor, and system which can be of significant benefit to identification and credit transactions. Even if a card is lost, or forged, it will be of no use to an unauthorized individual since print identification is required. The legitimate user can complete a transaction without the need to have attending personnel present (except in the above-described unusual situation of a non-match). Thus, significant savings in time, money, and convenience are achieved.

What is claimed is:

1. In a thumbprint or fingerprint identification system wherein a user first manually associates his own identification card with a sensor assembly to initiate an identification transaction and then places his thumbprint or fingerprint on a transparent area of the card so that the sensor can scan the print, the improvement comprising means for preventing the user from disassociating the card from the sensor until the residual print is wiped from the transparent area.

* * * * *